United States Patent
Gammel et al.

(10) Patent No.: US 11,283,613 B2
(45) Date of Patent: Mar. 22, 2022

(54) SECURE CONTROL OF INTELLIGENT ELECTRONIC DEVICES IN POWER DELIVERY SYSTEMS

(71) Applicant: Schweitzer Engineering Laboratories, Inc., Pullman, WA (US)

(72) Inventors: Dennis Gammel, Pullman, WA (US); Josh Powers, Pullman, WA (US); Jason A. Dearien, Moscow, ID (US); Joshua Thomas Pereyda, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 273 days.

(21) Appl. No.: 16/655,642

(22) Filed: Oct. 17, 2019

(65) Prior Publication Data
US 2021/0119795 A1 Apr. 22, 2021

(51) Int. Cl.
*H04L 9/32* (2006.01)
*H04L 29/06* (2006.01)
*G05B 19/042* (2006.01)

(52) U.S. Cl.
CPC ........ *H04L 9/3213* (2013.01); *G05B 19/0426* (2013.01); *H04L 63/083* (2013.01); *H04L 63/0876* (2013.01); *G05B 2219/24163* (2013.01)

(58) Field of Classification Search
CPC . H04L 9/3213; H04L 63/083; H04L 63/0876; H04L 63/0807; G05B 19/0426; G05B 2219/24163; Y04S 40/20

USPC .......................................................... 713/159
See application file for complete search history.

(56) References Cited

U.S. PATENT DOCUMENTS

| | | | |
|---|---|---|---|
| 6,747,957 B1 | 6/2004 | Pithawala | |
| 7,266,849 B1 | 9/2007 | Gregory | |
| 7,872,983 B2 | 1/2011 | Lai | |
| 8,520,670 B1 | 8/2013 | Giniger | |
| 8,553,544 B2 | 10/2013 | Lai | |
| 8,800,044 B2 | 8/2014 | Raad | |
| 9,686,125 B2 | 6/2017 | Smith | |
| 9,760,504 B2 | 9/2017 | Vidyapoornachary | |
| 9,769,060 B2 | 9/2017 | Dearien | |
| 9,866,483 B2 | 1/2018 | Smith | |
| 9,900,206 B2 | 2/2018 | Grussling | |
| 9,923,779 B2 | 3/2018 | Berner | |
| 10,341,311 B2 | 7/2019 | Smith | |
| 2007/0217344 A1 | 9/2007 | Krywaniuk | |
| 2012/0166818 A1* | 6/2012 | Orsini | H04L 9/3231 713/193 |
| 2013/0212285 A1 | 8/2013 | Hoffmann | |
| 2014/0029451 A1 | 1/2014 | Nguyen | |

(Continued)

*Primary Examiner* — Jeffrey C Pwu
*Assistant Examiner* — Nega Woldemariam
(74) *Attorney, Agent, or Firm* — Justin K. Flanagan

(57) ABSTRACT

Systems and methods are disclosed herein relating to the secure configuration of intelligent electronic devices. Intelligent electronic devices are used in electric power generation and transmission systems for protection, control, automation, and/or monitoring of equipment. The use of tokens and token-based digital signatures in the configuration process of intelligent electronic devices reduces the likelihood of malicious acts or unintended errors. Tokens distributed to engineers, technicians, intelligent electronic devices, computing devices, and/or software decrease the likelihood of errors being introduced in the configuration process.

22 Claims, 5 Drawing Sheets

(56) References Cited

U.S. PATENT DOCUMENTS

| | | |
|---|---|---|
| 2017/0026225 A1 | 1/2017 | Smith |
| 2017/0026226 A1 | 1/2017 | Grussling |
| 2017/0026243 A1 | 1/2017 | Berner |
| 2017/0026252 A1 | 1/2017 | Dearien |
| 2017/0026276 A1 | 1/2017 | Dearien |
| 2017/0026291 A1 | 1/2017 | Smith |
| 2017/0026292 A1 | 1/2017 | Smith |
| 2017/0026349 A1 | 1/2017 | Smith |
| 2017/0026187 A1 | 3/2017 | Ramatchandirane |
| 2017/0289117 A1 | 10/2017 | Powers |
| 2018/0358944 A1* | 12/2018 | Kurimoto ........... H03F 3/45475 |

* cited by examiner

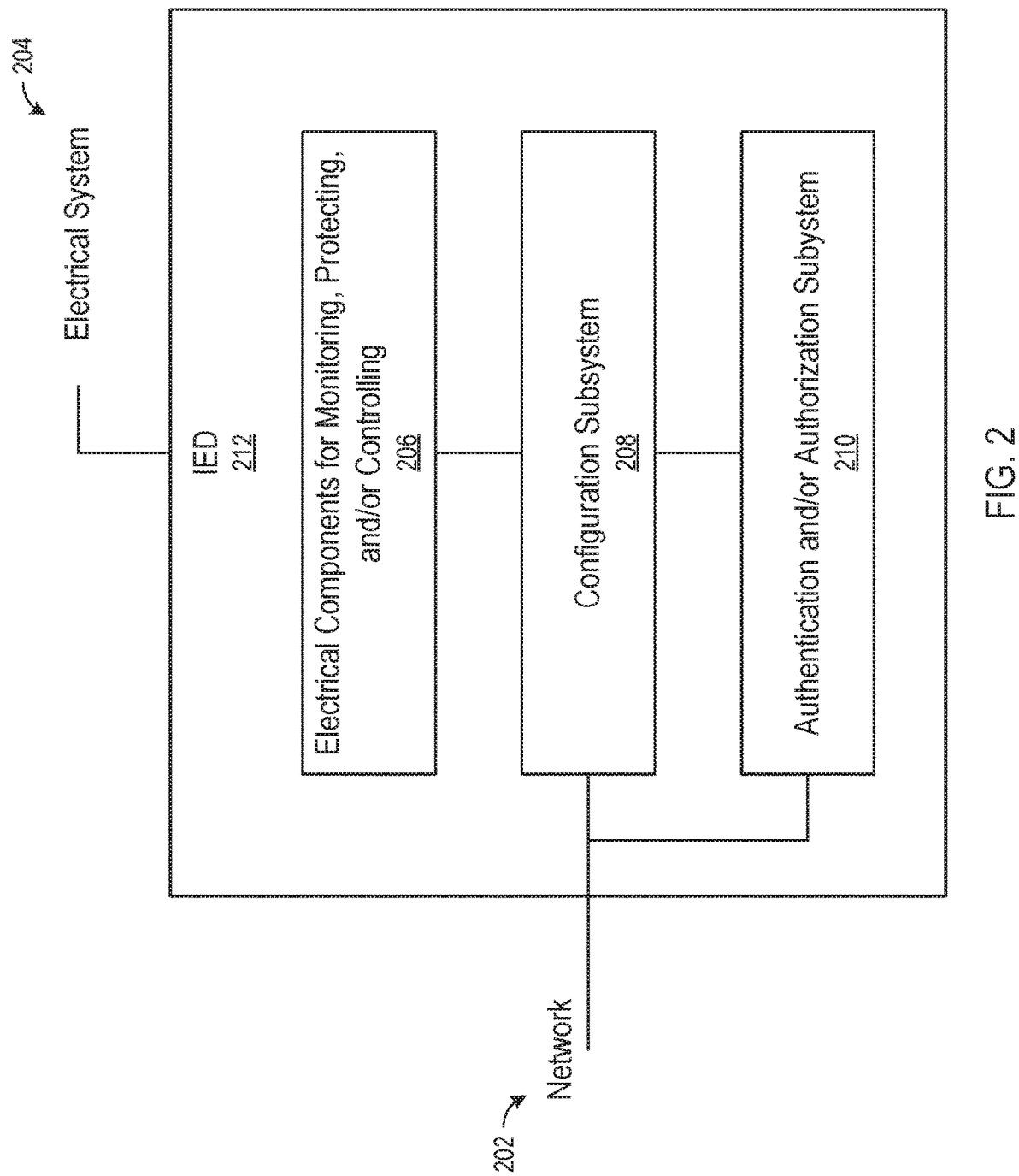

SECURE CONTROL OF INTELLIGENT ELECTRONIC DEVICES IN POWER DELIVERY SYSTEMS

TECHNICAL FIELD

This disclosure relates to intelligent electronic devices (IEDs) used to control, monitor, and protect power delivery systems. More particularly, this disclosure relates to the secure configuration and programming of IEDs used in the delivery, control, protection, and monitoring of electrical power.

BRIEF DESCRIPTION OF THE DRAWINGS

The written disclosure herein describes illustrative embodiments that are non-limiting and non-exhaustive. Reference is made to certain of such illustrative embodiments that are depicted in the figures described below.

FIG. 2 illustrates an example of an IED comprising electronic components, a configuration module, and/or an authentication and authorization module.

DETAILED DESCRIPTION

Figure 1A:
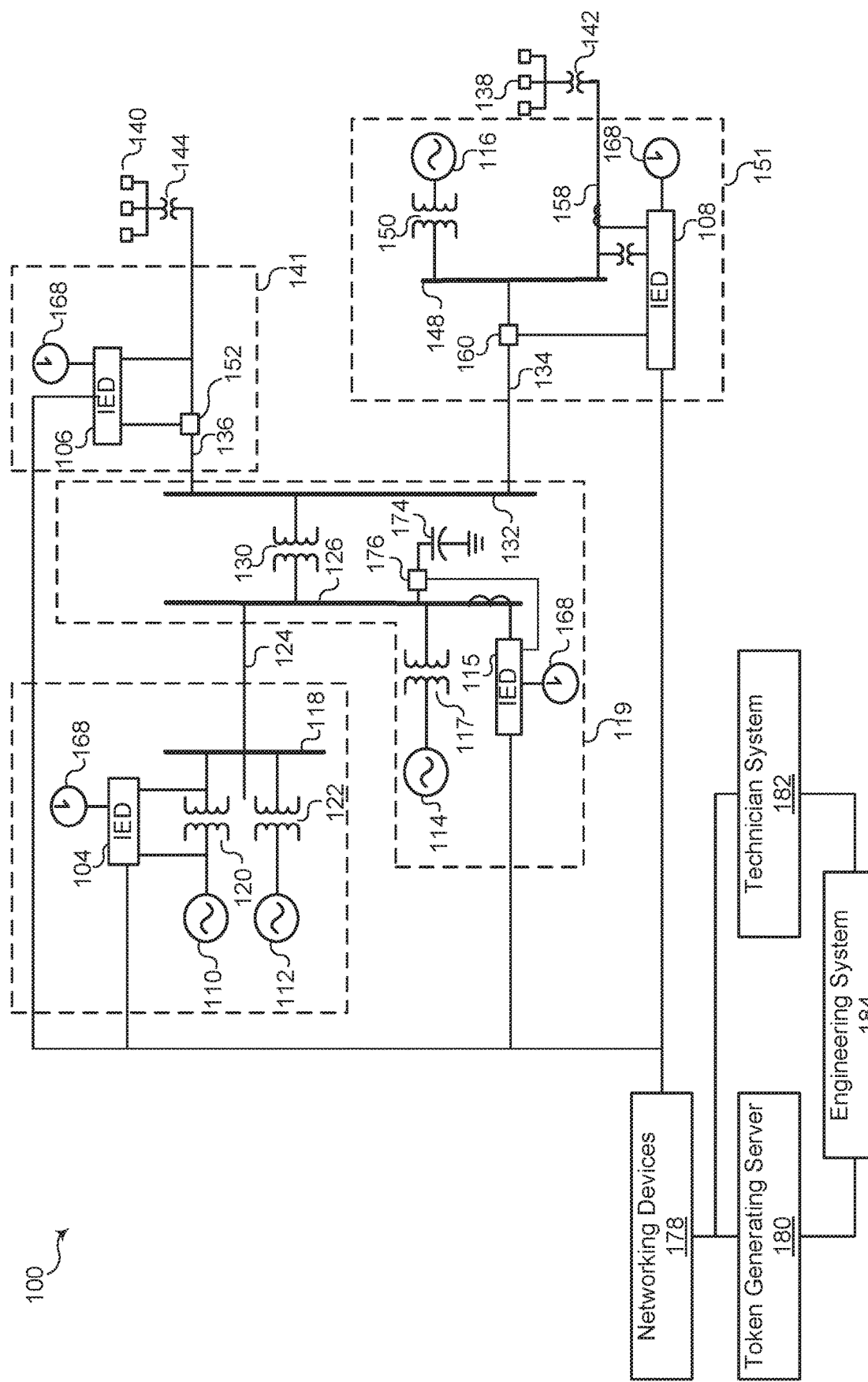
FIG. 1A illustrates an example of a simplified one-line diagram of an electric power delivery system in which intelligent electronic devices (IEDs) communicate with a technician system, an engineering system, and a token generating server.

Electric power delivery systems are an important part of the world's infrastructure. Various systems and methods are described herein to protect these systems from physical and electronic intrusion. Additionally, various systems and methods are described to protect these systems from errors introduced by well-meaning engineers, technicians, and/or others having apparent, but not actual, authority. While various business processes may be utilized to minimize such mistakes or failures, the presently described systems and methods provide token-based authentication schemes that serve to protect electrical devices from physical and electronic intrusion and from errors introduced by well-meaning engineers, technicians, and others. According to various embodiments, a token defines the access privileges and permissions associated with the person and/or device for a particular access session or defined time period.

Electric power delivery systems may be monitored, controlled, automated, and/or protected using intelligent electronic devices (IEDs). In general, IEDs in an electric power generation and transmission system may be used for protection, control, automation, and/or monitoring of equipment in the system. For example, IEDs may be used to monitor, protect, or control equipment of many types, including equipment associated with electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED may refer to any microprocessor-based device that monitors, controls, automates, and/or protects monitored equipment within an electric power delivery system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

Engineers typically develop a configuration package for an IED to reduce failures and/or increase the efficiency and safety of their electric power distribution and transmission systems. The configuration package is then installed into the appropriate device by a technician. This separation of responsibility and the associated business process reduces the opportunity for error. This separation of responsibility can be enhanced with the inclusion of authentication and authorization tokens at various steps in the process.

In some embodiments, an engineer may develop an IED configuration package for a particular type of device, or even for a uniquely identified device. For example, the device type might be a specific type of relay, while the uniquely identified device may be a specific relay among a multiplicity of relays of the same type. After developing a configuration package, an engineer may pass the design through a defined business process comprising testing, documenting, and/or approvals. During and/or at the conclusion of this business process, the configuration package may be annotated with the device type for which it is intended, the specific target unit (i.e., uniquely identified), and/or the time period in which it must be installed. Ultimately, the engineer may digitally sign the resulting configuration package.

In various embodiments, the process of digitally signing the configuration package (e.g., a data file, a configuration file, a control file, an executable instruction set, etc.) may include requesting one or more tokens from a token generating server. The firmware update token may include the configuration package to be included in the signing by the token generating server. The token provides information for the IED for which the configuration package is intended. The token generating server may further distribute one or more tokens to the technician(s) assigned to install the configuration package, software to be used by the technician to install the configuration package, and/or devices to be used by the technician to install the configuration package. In some embodiments, the token may alternatively or additionally include a hash of the configuration package to allow for further validation.

In various embodiments, the technician utilizes an authenticated computing device and/or authenticated software to interact with the IED with an authenticated computing device (e.g., a laptop, notebook, tablet device, mobile phone, etc.). The IED authenticates the token(s) delivered by the software to ensure that the technician is using the proper computing device, software, and/or version. The IED makes this determination by comparing the token presented by the computing device to the verification key distributed to the IED by the token generating server or organization's key server(s). If the token(s) is/are invalid, the incorrect computing device, installation software, or version is being used.

Matched tokens may be identical in some embodiments (e.g., symmetric tokens). In other embodiments, token matching may include public/private key schemes, cryptographic keys, digital signatures, biometric data, asymmetric tokens, or the like.

The IED may also authenticate the technician's token to ensure the intended individual is involved in this interaction. Finally, the configuration package is presented to the IED for validation. From the configuration package, the IED acquires the engineer's digital signature, the device type for which the configuration package is intended, the specific unit for which the configuration package is intended, and/or the time window within which the configuration package must be installed. The digital signature identifies the engineer who created the configuration package and identifies whether the configuration package was tampered with after it was signed.

The IED evaluates the tokens, digital signature, and/or the configuration package using a public or symmetric key, or other token-validating information, provided by the token generating server organizational owner. The IED receives information from the token(s) to identify an authenticated computing device, authenticated installation software, one or more authenticated technicians, and the authorized engineer. The configuration package is authenticated for installation and put into production when an authenticated technician, using authenticated software on an authenticated computing device, delivers an unmodified configuration package created by the authorized engineer. As previously noted, in some embodiments, the IED may further authenticate that the configuration package is being installed within a specified time window, that the configuration package was developed for the correct device type, and/or that the configuration package was developed for the specific device on which it is being installed. If one or more of these conditions fail to be true, the configuration may be rejected. Embodiments may be adapted to include all of the above-identified authentication items, or any subset or combination thereof.

For example, a token generating server may distribute a single token to a technician, a computing device, software on the computing device, and/or the target IED. In such an embodiment, the IED allows for access and installation of a configuration file only when a technician's token is provided, possibly also containing information on the software allowed, engineer identifier, IED identifier, IED type, and/or IED firmware version. the IED may authenticate that the configuration package and associated signature are unmodified and installed on the proper IED.

In other embodiments, an engineer may develop an IED configuration package. A configuration package may include any of a wide variety of configuration settings, network settings, protections settings, and/or the like. The configuration package may be developed for a specific protection system, a particular type of device, and/or a specific (i.e., uniquely identified) device and/or IED firmware revision. The engineer may pass the configuration package through a defined business process comprising testing, documenting, and/or approvals. During and/or at the conclusion of this business process, the configuration package may be annotated with the device type it is intended for, the specific target device, and/or the time period within which it must be installed. The organization or TGS may digitally sign the configuration package and include information from the token generating server, such as the engineer creating package, IED identifier, IED type, IED firmware version, time window for installation, and other necessary information for verification and logging purposes.

The technician may receive a signed configuration package from the engineer, TGS, or other data repository. The technician may interact with the target IED via authenticated installation software and/or authenticated computing device. The installation software may contact a token generating server to acquire a token. The installation software may provide the received token to the IED for authentication. The IED may authenticate the token delivered by the software of the computing device to ensure that the technician is using and authenticated computing device and/or authenticated software.

Similarly, the technician may request a token from a token generating server, and the IED may then authenticate the token to ensure that an authenticated technician is conducting the installation, update, or modification. Finally, the configuration package is presented to the IED for validation. From the configuration package, the IED acquires the authorized digital signature, the engineer(s)' approval on the configuration change, the device type for which the configuration package is intended, the specific unit for which the configuration package is intended, and/or the time window within which the configuration package must be installed. The token identifies the engineer who created the configuration and identifies whether the configuration was tampered with after it was signed.

In some embodiments, when an IED is successfully reconfigured it can log the results and/or send a notification to the technician, the software being used, the computing device being used, the token generating server, and/or the engineer who developed the installed configuration. Similarly, a rejected configuration attempt can be logged or a notification may be sent to an designated individual, group, and/or system. The log entry or notification may include the reason for failure as well as other relevant information.

The embodiments of this disclosure can be further understood by reference to the drawings, wherein like parts are designated by like numerals throughout. The components of the disclosed embodiments, as generally described and illustrated in the figures herein, could be arranged and designed in a wide variety of different configurations. Thus, the following description of the embodiments of the systems and methods of the disclosure is not intended to limit the scope of the disclosure, as claimed, but is merely representative of possible embodiments.

The phrases "connected to," "coupled to," and "in communication with" refer to any form of interaction between two or more components, including mechanical, electrical, magnetic, and electromagnetic interaction, depending on the context. Two components may be connected to each other, even though they are not in direct contact with each other, and even though there may be intermediary devices between the two components.

FIG. 1A illustrates an embodiment of a simplified one-line diagram of an electric power transmission and distribution system 100. The electric power delivery system 100 may be configured to generate, transmit, and distribute electric power to loads. Electric power delivery systems may include equipment such as electric generators (e.g., generators 110, 112, 114, and 116), power transformers (e.g., transformers 117, 120, 122, 130, 142, 144 and 150), power transmission and delivery lines (e.g., lines 124, 134, 136 and 158), circuit breakers (e.g., breakers 152, 160, 176), busses (e.g., busses 118, 126, 132, and 148), loads (e.g., loads 138 and 140) and the like. A variety of other types of equipment may also be included in the electric power delivery system 100, such as voltage regulators, capacitor banks, and a variety of other types of equipment.

A substation 119 may include a generator 114, which may be a distributed generator, and which may be connected to the bus 126 through a step-up transformer 117. The bus 126 may be connected to a distribution bus 132 via a step-down transformer 130. Various distribution lines 136 and 134 may be connected to the distribution bus 132. The distribution line 136 may lead to a substation 141 and the distribution line 136 may be monitored and/or controlled using an IED 106, which may selectively open and close a breaker 152. A load 140 may be fed from the distribution line 136. A step-down transformer 144 in communication with the distribution bus 132 via the distribution line 136 may be used to step down a voltage for consumption by the load 140.

The distribution line 134 may lead to a substation 151 and deliver electric power to the bus 148. The bus 148 may also receive electric power from the distributed generator 116 via a transformer 150. The distribution line 158 may deliver electric power from the bus 148 to the load 138 and may include another step-down transformer 142. The circuit breaker 160 may be used to selectively connect the bus 148 to the distribution line 134. An IED 108 may be used to monitor and/or control the circuit breaker 160 as well as the distribution line 158.

The electric power delivery system 100 may be monitored, controlled, automated, and/or protected using intelligent electronic devices (IEDs), such as IEDs 104, 106, 108, and 115. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, and 115) may refer to any microprocessor-based device that monitors, controls, automates, and/or protects monitored equipment within system 100. An IED may, in some embodiments, utilize field-programmable gate arrays (FPGAs) and/or application-specific integrated circuits (ASICs) instead of or in addition to a microprocessor. Examples of IEDs include, without limitation, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

In some embodiments, an IED configuration package is developed on an engineering system 184 for a particular type of IED or even for a specific, uniquely identified IED. A valid, approved, and/or annotated IED configuration package is created and approved by an engineer. The IED(s)' and engineer's information is tied to the configuration package as a digitally signed token. The resulting configuration package is distributed to a technician system 182 and a token generating server 180 is instructed to distribute tokens. A token generating server 180 distributes one or more tokens to the technician assigned to install the configuration package, the computing device to be used by the technician, the software to be used by the technician, and/or the intended IED (such as IEDs 104, 106, 108, and 115) via networking devices 178. Each of the engineering system 184 and the technician system 182 may comprise an electronic computing device, such as a desktop computer, cloud-based computing device, laptop, portable electronic device, terminal or the like.

The technician uses the authenticated computing device and software to interact with and install the signed configuration package on the target IED. In the illustrated embodiments, the technician connects to an IED (such as IEDs 104, 106, 108, and 115) via networking devices 178 using the authenticated software and/or authenticated computing device. The IED receives the token of the computing device, the software's token, and/or the technician's personal token via network devices 178 for authentication. Finally, the configuration package is presented to the IED for verification and validation.

The IED (such as IEDs 104, 106, 108, and 115) evaluates the tokens, digital signature, and/or the configuration package. If the configuration package, device, time window, and/or the tokens are correct, the configuration package is installed and put into production. Otherwise, the configuration is rejected.

In some embodiments, the interaction between the technician and the target IED (such as IEDs 104, 106, 108, and 115) begins with the technician system 182 being connected to the target IED using the authenticated computing device and/or authenticated software via networking devices 178. The software of the computing device contacts the token generating server 180 to acquire token(s) (a software token, a computing device token, technician token, etc.). The target IED authenticates the token(s) delivered by the software of the computing device. The token(s) may only be provided if the software, computing device, and/or the technician are authenticated. Thus, the IED may authenticate the software, computing device, and/or technician based on the presentation of the respective token(s).

The technician also requests a token from a token generating server 180 (a technician token). The token generating server 180 only provides tokens to known, trusted technicians. In some embodiments, a technician token is only provided to a technician that is approved by an owner or operator of the token generating server 180, a third party, and/or the engineer that created that configuration package. The IED (such as IEDs 104, 106, 108, and 115) authenticates the technician token to ensure an authenticated individual is involved in the installation of the configuration package. The IED may also evaluate the token of the configuration package, which is also a digital signature of the configuration package to ensure that it is unchanged.

Networking devices 178 may include, but are not limited to, multiplexers, routers, hubs, gateways, firewalls, and switches. In some embodiments, IEDs and networking devices may comprise physically distinct devices. In other embodiments, IEDs and networking devices may be composite devices or may be configured in a variety of ways to perform overlapping functions. IEDs and networking devices may comprise multi-function hardware (e.g., processors, computer-readable storage media, communications interfaces, etc.) that can be utilized to perform a variety of tasks that pertain to network communications and/or the operation of equipment within system 100. Thus, the terms "networking device" and "IED" may be used interchangeably in some instances to the extent that the IED is interacting with a network and/or to the extent that a networking device is performing a function of an IED as described herein.

Figure 1B:
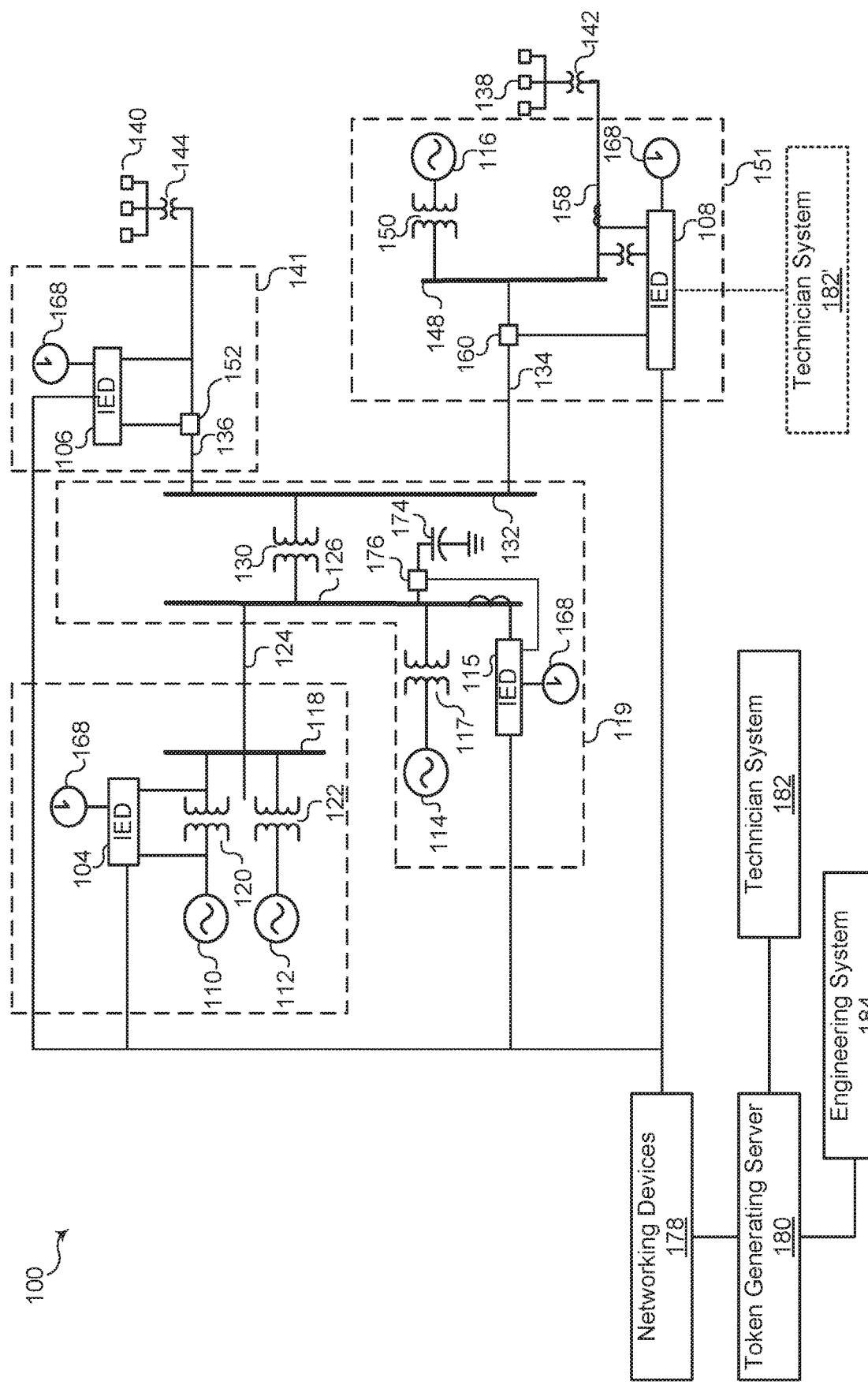
FIG. 1B illustrates an alternative embodiment of an electric power delivery system with a technician system separately connected to an IED.

FIG. 1B illustrates an alternative embodiment of the electric power delivery system 100. In the illustrated embodiment, the access control system still includes a token generating server 180 in communication with the various IEDs 104, 106, 108, and 115. An engineer may utilize the engineering system 184 to request a token from the token generating server 180 confirming that the engineer is authorized to develop a configuration package for one or more of the IEDs 104, 106, 108, and/or 115. In some embodiments, the engineer may utilize the engineering system 184 to request a token confirming that the engineer is authorized to develop a configuration package specifically for the IED device type of IED 108, or even the uniquely identified IED 108.

The token generating server 180 may confirm the authorization status of the engineer and grant the engineer a token. The engineer may create a configuration package and, after a review process, have it and a token containing pertinent information signed for later verification by the IED 108 (e.g., embed, hash, or otherwise associate the token with the configuration package). The token generating server 180 may provide one or all of the IEDs 104, 106, 108, and 115 with the token or other token-authenticating information to allow each IED to authenticate the engineer's token on the configuration package at a later time.

A technician may request a token via the technician system 182 from the token generating server 180. The token generating server 180 may confirm that the technician is authorized to install the configuration package on one or more of the IEDs 104, 106, 108, and 115, or at least on uniquely identified IED 108. The token generating server 180 may provide the technician with a token confirming the authorization status of the technician and provide one or more of the IEDs 104, 106, 108, and 115 with token-authenticating information to authenticate the technician at a later time. Shown in broken lines, the technician system 182' (e.g., a terminal or portable electronic device used by the technician) may subsequently be connected to the IED 108. The IED 108 may use the token-authenticating information to authenticate at least (1) that the configuration package was created by an authorized engineer and (2) that the technician is authorized to install the configuration package. If either condition fails, the IED 108 may reject the configuration package and/or deny the technician access. The technician system 182 and the technician system 182' may be the same device or may be different devices.

FIG. 2 illustrates an example IED 212 comprising electrical components 206, a configuration subsystem 208, and an authentication and/or authorization subsystem 210. The authentication and/or authorization subsystem 210 receives one or more tokens (or token-authenticating information) via the network connection 202. The IED 212 may use these tokens or token-authenticating information to authenticate computing devices used by the technicians, software connecting to the IED 212, configuration packages presented to the IED 212, and/or technicians attempting to interact with the IED 212.

The configuration subsystem 208 receives configuration packages via the network 202 and processes them to acquire the token identifying an authorized engineer, firmware revision, digital signature, IED type, and/or IED unit. The IED 212 may also determine whether the configuration package has been tampered with or not. If tokens from the technician, computing device used by the technician, software used by the technician, and/or the configuration package are authenticated (i.e. are symmetrically or asymmetrically authenticated) the configuration package is accepted and the electrical components 206 are controlled according to the specifications of the configuration package. In some embodiments, the IED 212 may further require the installation of the configuration package to have occurred within a predetermined time period specified by the token generating server and/or a token itself.

Figure 3:
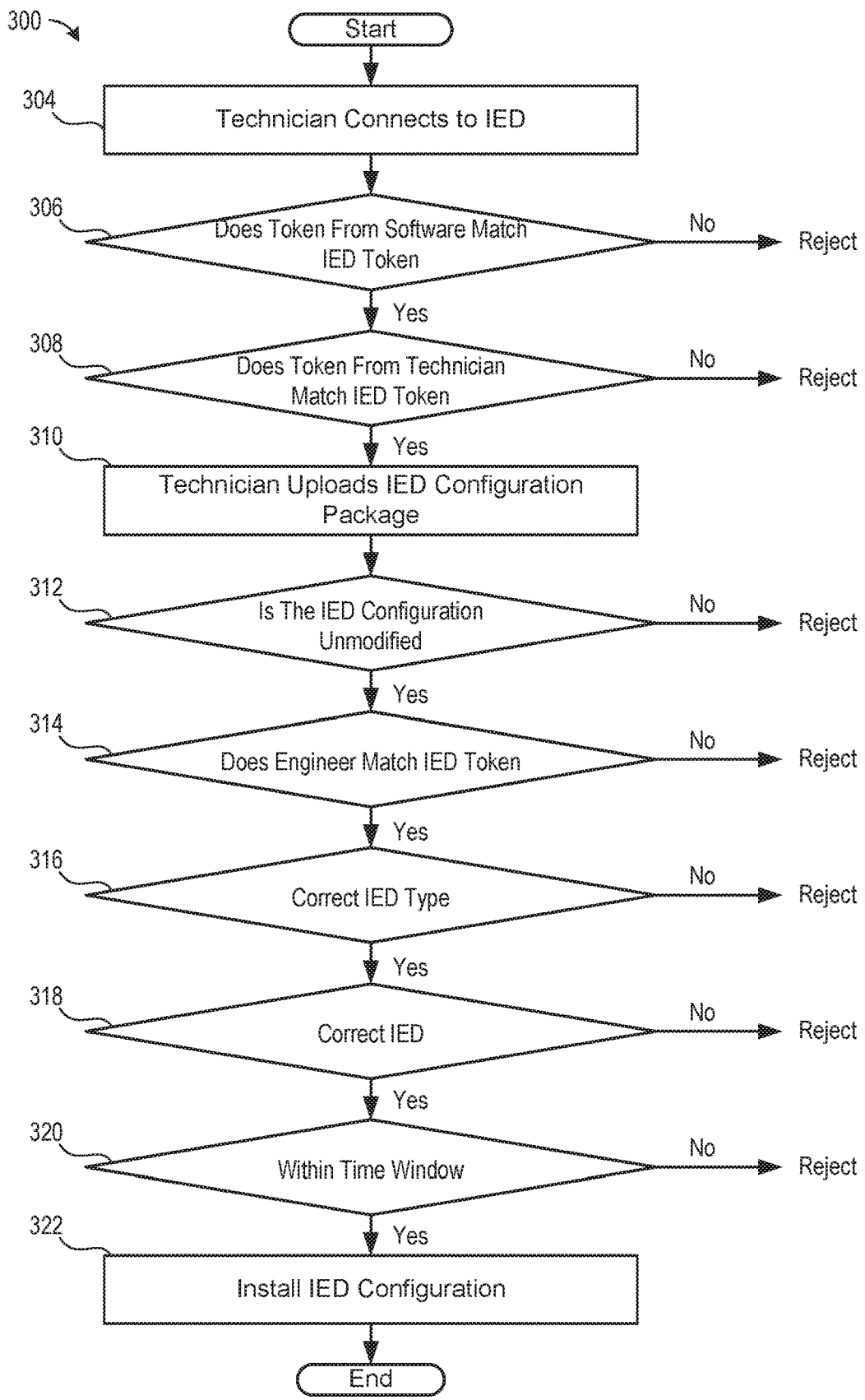
FIG. 3 illustrates a flow diagram describing how an IED configuration is deployed using token-based authentication and authorization.

FIG. 3 illustrates a flow diagram 300 describing one embodiment where an IED configuration is deployed with appropriate authentication and authorization. In this embodiment, the technician connects, at 304, to an IED. The IED verifies, at 306, the token(s) to confirm that the software and/or computing devices used by a technician are correct and authorized. The IED then verifies, at 308, the technician token and ensures the technician is authorized to modify or otherwise interact with the IED. If any of these tokens (software token, computing device token, and/or technician token) are invalid, the configuration package is rejected and a log may be generated. If all tokens are accepted, the technician can install 310 the configuration package and a log may be generated.

The IED may further utilize, at 312, a hash or other encoded information of a token associated with the configuration package to ensure that the configuration has not been modified. Still further, the IED may validate, at 314, that the engineer who signed the configuration package is an authorized engineer. In some embodiments, the IED may further utilize information encoded in the configuration package token to confirm that the configuration package is for the correct IED type, at 316, for the specific (uniquely identified) IED, at 318, and/or that the configuration package is being installed within defined time windows, at 320. The IED allows, at 322, the technician to install the configuration package when one or more of the conditions illustrated in FIG. 3 are implemented. In various embodiments, any action taken by the IED and/or requests made to the IED may be logged.

For example, in one embodiment, an IED may allow for the installation of a configuration package upon satisfaction of steps 308 and 314. That is, as long as a token provided by a technician attempting to make changes and a token associated with an engineer who developed the changes are both confirmed as valid, the IED may allow for the installation of the configuration package. Other embodiments may further implement any subset or combination of the various validation steps shown in FIG. 3 in the illustrated order or in a different order.

Figure 4:
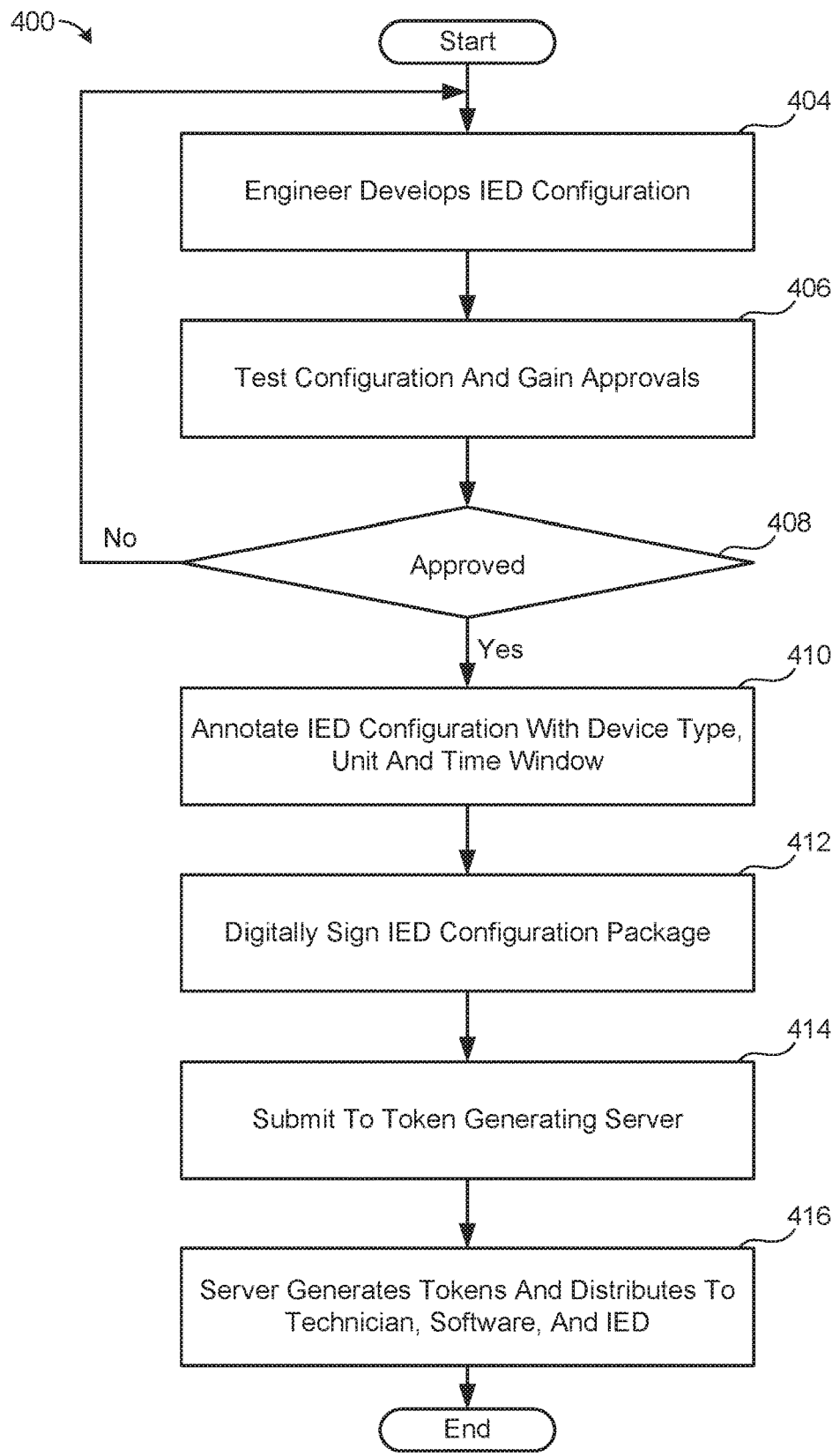
FIG. 4 illustrates a flow diagram describing how an IED configuration and associated tokens are distributed to appropriate systems, modules, and/or individuals.

FIG. 4 illustrates a flow diagram 400 describing how an IED configuration package is developed and distributed to a technician with associated tokens. In this embodiment, an engineer develops, at 404, an IED configuration package. The resulting IED configuration package may optionally be reviewed, at 406, in a business process comprising reviews, tests, and/or approvals. Steps 404 and 406 may be repeated until an acceptable or "approved" IED configuration package is obtained. When the IED configuration package is approved, at 408, the configuration may optionally be annotated, at 410, with the IED type, the specific IED (uniquely identified IED) to be configured, engineer(s)' identifier, and/or the time window within which the configuration package must be installed. This annotation is the token which is digitally signed along with the configuration package, at 412, by the engineer for distribution to a technician. The token is submitted to a token generating server, at 414. At 416, a token generating server generates and distributes tokens along with the configuration package to the assigned technician, the computing device, and/or the software that will be used to configure the selected IED.

The token generating server may further distribute tokens (or other token-validating information), at 416, to a target IED to enable the target IED to validate that the engineer associated with the configuration package is authorized, that the configuration package is unmodified, that the technician is authorized, that the software being used for the installation is authorized, that the computing device is authorized, that the configuration package is intended for the IED device type matching that of the target IED, that the configuration package is intended specifically for the target IED, and/or that the configuration package is being installed on the target IED within an authorized time window.

Specific embodiments and applications of the disclosure are described above and illustrated in the figures. It is, however, understood that many adaptations and modifications can be made to the precise configurations and components detailed above. In some cases, well-known features, structures, or operations are not shown or described in detail. Furthermore, the described features, structures, or operations may be combined in any suitable manner in one or more embodiments. It is also appreciated that the components of the embodiments as generally described and illustrated in the figures herein could be arranged and designed in a wide variety of different configurations. Thus, all feasible permutations and combinations of embodiments are contemplated.

In the description above, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure includes all permutations and combinations of the independent claims with their dependent claims.

What is claimed is:

1. An access control system to restrict access to an intelligent electronic device (IED) in a power delivery system, comprising:
   a token generating server to:
      provide an engineer token to be associated with a configuration package for an IED to:
         validate that the configuration package was developed by an authorized entity, and
         identify a device type for which the configuration package is intended, and
      provide a technician token that is different from the engineer token to a technician to validate that the technician is authorized to install the configuration package on the IED,
      wherein the technician token comprises at least one of a cryptographic key, an asymmetric token, a symmetric token, and a digital signature;
   a communications network to transmit token-authenticating information from the token generating server to the IED; and
   an authorization subsystem of the IED to:
      (1) authenticate the technician token in response to an installation request using the token-authenticating information from the token generating server,
      (2) authenticate the engineer token associated with the configuration package using the token-authenticating information from the token generating server, including authenticating that the configuration package is intended for the device type of the IED,
      (3) reject installation of the configuration package upon failure to authenticate one or both of the engineer token and the technician token, and
      (4) log access and authentication results.

2. The system of claim 1, wherein the authorization subsystem of the IED is further configured to log installation requests, authentication of engineer tokens, and rejections.

3. The system of claim 1, wherein the technician token identifies software and hardware for which the configuration package is intended, and wherein the authorization subsystem of the IED is further configured to authenticate that the configuration package is intended for the software and hardware of the TED.

4. The system of claim 1, further comprising an engineering system to be used by an engineer to:
   request the engineer token from the token generating server, and
   provide token-authenticating information to the IED for subsequent authentication of the configuration package prior to installation thereof.

5. The system of claim 1, further comprising a technician system to be used by a technician to:
   request the technician token from the token generating server, and
   provide the token-authenticating information to the IED for subsequent authentication of the technician prior to installation of the configuration package.

6. The system of claim 5, wherein the technician system communicates with the IED via the communications network.

7. The system of claim 5, further comprising a remote technician system through which the technician provides the technician token and the configuration package to the IED independent of the communications network.

8. The system of claim 1, wherein the token generating server is configured to sign the configuration package annotated with the engineer token, and wherein the authorization subsystem is further configured to authenticate that the configuration package is unchanged.

9. The system of claim 1, wherein the authorization subsystem is configured to authenticate that the configuration package is intended for the device type of the IED using at least one of a unique identifier of the IED and a firmware version of the TED.

10. The system of claim 1, wherein the engineer token uniquely identifies the IED for which the configuration package is intended, and wherein the authorization subsystem is further configured to authenticate that the configuration package is intended for the TED.

11. The system of claim 1, wherein the engineer token identifies a time window for installation of the configuration package, and wherein the authorization subsystem is further configured to prevent installation of the configuration package outside of the time window.

12. An intelligent electronic device (IED), comprising:
   an input port to receive a request from a technician to install a configuration package;
   an authorization subsystem to:
      (1) authenticate a technician token provided by the technician to validate that the technician is authorized to install the configuration package,
      (2) authenticate an engineer token that is different than the technician token, wherein the engineer token comprises a hash of the configuration package that can be used to validate that the configuration package was developed by an authorized entity, wherein the engineer token identifies a device type for which the configuration package is intended,
(3) authenticate that the configuration package is intended for the TED based on the device type identified in the engineer token; and a configuration subsystem to allow installation of the configuration package by the technician upon authentication of both the technician token and the engineer token.

13. The system of claim 12, wherein the engineer token is annotated and signed along with the configuration package, and wherein the authorization system uses token-authenticating information received by a token generating system to further authenticate the engineer token and the configuration package.

14. The system of claim 12, wherein the authorization system uses token-authenticating information received by a token generating system to authenticate the technician token provided by the technician.

15. The system of claim 12, wherein at least one of the technician token and the engineer token comprises an asymmetrical token, and wherein the authorization system uses token-authenticating information for authentication that is non-reverse-engineerable.

16. The system of claim 12, wherein the engineer token further identifies a device type for which the configuration package is intended, and wherein the authorization subsystem is further configured to authenticate that the configuration package is intended for at least one of a device type of the IED, a unique identifier of the IED, and a firmware version of the TED.

17. The system of claim 12, wherein the engineer token identifies software and hardware for which the configuration package is intended, and wherein the authorization subsystem is further configured to authenticate that the configuration package is intended for the software and hardware of the TED.

18. The system of claim 12, wherein the engineer token identifies a time window for installation of the configuration package, and wherein the authorization subsystem is further configured to prevent installation of the configuration package outside of the time window.

19. A method for intelligent electronic device (IED) access control, comprising:
generating an engineer token that includes a hash of a configuration package to be used to validate that:
(1) the configuration package was developed by an authorized entity, and
(2) the configuration package is intended for the device type of the IED;
generating a technician token that is different than the engineer token, wherein the technician token facilitates validation that a technician is authorized to install the configuration package on the IED;
providing token-authenticating information to the IED to enable the IED to subsequently authenticate each of the engineer token and the technician token;
receiving a request by the technician to install the configuration package;
receiving the technician token from the technician;
authenticating the technician token to validate that the technician is authorized to install the configuration package;
receiving the configuration package for installation on the IED, wherein the configuration package is signed by the authorized entity;
authenticating the engineer token to validate the configuration package and the device type of the IED; and
modifying at least one setting of the IED as dictated within the configuration package in response to authentication of both the technician token and the engineer token.

20. The method of claim 19, wherein the engineer token identifies a time window for installation of the configuration package, and wherein the method further comprises authenticating that a technician's request to modify at least one setting of the IED is within the specified time window.

21. The method of claim 19, wherein the engineer token is appended to and signed along with the configuration package, and wherein the method further comprises using asymmetrical token-authenticating information to authenticate the engineer token and validate that the configuration package is unmodified.

22. The method of claim 20, further comprising logging at least one of the engineer token and the technician token.

* * * * *